United States Patent
Schuelke et al.

(12) 
(10) Patent No.: US 6,392,000 B1
(45) Date of Patent: May 21, 2002

(54) BINDER FOR A COATING COMPOSITION FOR ELECTRICAL CONDUCTORS

(75) Inventors: Wolfgang Schuelke, Haan; Rainer Krause; Diethard Winkler, both of Wuppertal, all of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 13 days.

(21) Appl. No.: 09/697,384

(22) Filed: Oct. 26, 2000

(51) Int. Cl.⁷ ................................................ C08G 18/30
(52) U.S. Cl. .......................... 528/49; 528/45; 528/59; 528/74.5; 525/453; 428/375
(58) Field of Search ............................. 528/49, 59, 45, 528/74.5; 525/453; 428/375

(56) References Cited

U.S. PATENT DOCUMENTS 3,884,880 A * 5/1975 Disque et al.
5,254,408 A 10/1993 Takeuchi et al.

FOREIGN PATENT DOCUMENTS

| DE | 0072178 A1 | 2/1983 |
| DE | 19515263 A1 | 10/1996 |
| DE | 19517199 A1 | 11/1996 |
| EP | 0103307 A2 | 3/1984 |
| EP | 0104986 A1 | 4/1984 |
| WO | WO 93/00379 | 1/1993 |

* cited by examiner

*Primary Examiner*—Rachel Gorr
(74) *Attorney, Agent, or Firm*—Sudhir G. Deshmukh

(57) ABSTRACT

A binder comprising a block polymer of blocks A and B and at least one of the blocks of C and D or E and F. The blocks are formed from:

A monocarboxylic acids having 15 to 50 carbon atoms,

B polyisocyanates having at least two isocyanate groups,

C polycarboxylic acids having at least two carboxyl and/or anhydride groups,

D polyisocyanates having at least two isocyanate groups,

E polyalcohols having at least two hydroxyl groups, and

F polyisocyanates having at least two isocyanate groups.

The composition of the block polymer has the following composition: $(f+g)/h=0.5$ to $1.0$, $i/(h-f-g)=2.0$ to $25$ and $a/(c+e)=0.1$ to $1.0$, where a, c and e=total moles of A, C and E; f=total equivalents of hydroxyl groups, g=total equivalents of carboxyl and anhydride groups, h=total equivalents of isocyanate groups and I=total moles of A to F.

15 Claims, No Drawings

BINDER FOR A COATING COMPOSITION FOR ELECTRICAL CONDUCTORS

BACKGROUND OF THE INVENTION

The invention relates to a binder for a coating composition for enamel-insulated electrical conductors which is suitable for use as a lubricant.

In the manufacture of magnetic windings in electrical equipment, such as motors and transformers, electrical conductors coated with an insulating enamel are used. In order to improve processing of the enamelled wires on fast winding machines, the surface of the enamelled wire is coated with a lubricant. The lubricant is generally applied to the enamelled wire directly after it leaves the enamelling stove, and once the solvent has evaporated it forms a coating with good sliding capacity.

Known lubricants are paraffins and waxes applied to the enamelled wire with felts, for example as a 0.5 to 2% solution in an aromatic solvent.

U.S. Pat. No. 5,254,408 mentions, for example, the following organic lubricants: polyolefin hydrocarbons, such as polyethylene, polypropylene or polymethylene pentene. However, when used in motors running in coolants based on fluorocarbons, they can cause the nozzles to clog.

DE-A 195 17 199 and WO 93/0379 describe lubricants based on fatty acid esters or fatty acid amides which are readily soluble but not suitable for certain applications. For example, in enclosed relays they may shorten the service life of the contacts.

Furthermore, so-called internal lubricants are known. Lubricants of this type are incorporated into the composition of the wire enamel and migrate to a greater or lesser extent towards the enamel surface during curing. Examples of internal lubricants are the compounds mentioned above, such as polyethylene, polypropylene and polypropylene glycol and polytetrafluoroethylene and silicone oils, corresponding to EP-A 103307, EP-A 104986 and DE-A 195 15 263. The limited compatibility of these modifications usually results in phase separation, agglomeration or precipitation during storage.

EP-A 72178 describes modifications of wire enamel binders having hydrocarbon chains longer than 21 carbon atoms. The resulting enamel compositions are applied to the wire as the topcoat and cured. The disadvantages here are that the condensation into a wire enamel binder means that only small amounts of active substance are possible and it becomes difficult to align the hydrocarbon chains with the enamel surface. In particular with modern high-capacity enamelling plants, in which curing takes place extremely rapidly, the alignment of the active substance component with the surface of the enamel cannot be achieved to a satisfactory level.

SUMMARY OF THE INVENTION

The present invention provides a binder for a coating composition for enamelled wires which is suitable for use as a lubricant, is generally readily soluble, is highly efficient and does not have any disadvantageous effect on the technical parts connected to the magnetic windings, such as contacts and the like, so that it can be used for coating enamelled wires without any limitations and independently of the intended use thereof.

This binder is based on a structural block polymer of aliphatic monocarboxylic acids, polyisocyanates, polycarboxylic acids and/or polyalcohols, in which the individual components of the block polymer are in the form of structural blocks comprising A and B, C and D and E and F and the block polymer comprises any of the following structures: structural blocks A and B and at least one of the structural blocks C and D or E and F or structural blocks A and B and both structural blocks C and D and E and F and where the block polymer has free and/or blocked isocyanate groups; the structural blocks of the block polymer are prepared from:

- A aliphatic, saturated or unsaturated, linear or branched monocarboxylic acids having 15 to 50 carbon atoms,
- B aromatic and/or aliphatic polyisocyanates having at least 2 isocyanate groups,
- C aromatic and/or aliphatic polycarboxylic acids having at least 2 carboxyl and/or anhydride groups,
- D aromatic and/or aliphatic polyisocyanates having at least 2 isocyanate groups which may be the same as or different from B,
- E polyalcohols having at least 2 hydroxyl groups, and
- F aromatic and/or aliphatic polyisocyanates having at least 2 isocyanate groups which may be the same as or different from B and D, and in which the composition of the block polymer corresponds to the following definition:

$(f+g)/h = 0.5$ to $1.0$ $i/(h-f-g) = 2.0$ to $25.0$ $a/(c+e) = 0.1$ to $1.0$ where a=total moles of A, c=total moles of C, e=total moles of E, f=total equivalents of hydroxyl groups, g=total equivalents of carboxyl and anhydride groups, h=total equivalents of isocyanate groups, i=total moles of A to F.

DETAILED DESCRIPTION OF THE INVENTION

In the structural block polymer used in this invention, blocks comprising A and B are called AB below, and analogously the structural blocks comprising C and D are called CD and E and F are called EF. The block polymer comprises polymers of the structure AB—CD, AB—EF and AB—CD—EF.

Preferably, the ratios $(f+g)/h$ should be 0.6 to 0.9 and $i/(h-f-g)$ should be 2.5 to 10.

To manufacture the block polymer according to the invention, preferably first the reaction of at least one monocarboxylic acid A with at least one polyisocyanate B is carried out to give the structural block AB.

The structural block CD can be manufactured at the same time as or after formation of the structural block AB. For this, at least one polycarboxylic acid C is reacted with at least one polyisocyanate D, with the release of carbon dioxide and the formation of amide or imide groups.

In a subsequent reaction stage, the structural block EF can be incorporated by reacting at least one polyalcohol E with at least one polyisocyanate F and the still free isocyanate groups of AB and where appropriate CD.

The conversion reactions between the polyalcohols and polyisocyanates can be accelerated by using conventional catalysts for urethane formation. Suitable catalysts are for example tin or zinc compounds.

The reactions described can be carried out at temperatures in a range between 50 and 150° C.; for example, the reaction between A and B can be carried out in a range from 80 to 150° C.

The end of the reaction can be established for example by IR spectroscopy, or by the amount of carbon dioxide evolved, or by determining the isocyanate groups, or by the subsiding of the exothermic action when reacting polyisocyanates and polyols.

The result is a block polymer having free isocyanate groups, in which the remaining free isocyanate groups can where appropriate be blocked by the addition of conventional capping agents for isocyanates.

The resulting block polymer can be diluted to processing consistency using conventional solvents. Preferably, inert solvents are used for this, or solvents which are used as blocking agents, such as technical cresols, are used.

Further examples of solvents used for diluting include conventional solvents used for wire enamels such as N-methyl pyrrolidone, dimethyl formamide, dimethylacetamide, technical cresol s and the known glycol ether diluting agents, such as methyl glycol-tert.-butyl ether, ethyl glycol-tert.-butyl ether, methyl diglycol-tert.-butyl ether, and esters such as methoxypropyl acetate and ethoxypropyl acetate, ketones such as cyclohexanone and methyl isobutyl ketone and aromatic and aliphatic hydrocarbons such as toluene, xylene and Solvesso 100®.

The resulting block polymer can also be mixed with a conventional wire enamel composition.

Examples of A the aliphatic, saturated or unsaturated, linear or branched monocarboxylic acids having 15 to 50 carbon atoms are stearic acid, arachidic acid, oleic acid, erucic acid or the montanic acids (waxy acids having 24 to 36 carbon atoms).

Those monocarboxylic acids having more than 20 carbon atoms, such as erucic acid or the montanic acids, are preferred.

Examples of the polyisocyanates B, D and F are hexamethylene diisocyanate, isophorone diisocyanate, 1,12-dodecane diisocyanate, 2,4- and 2,6-toluylene diisocyanate (TDI), 2,4'- and 4,4'-diisocyanatodiphenylmethane (MDI) and naphthalene diisocyanate.

Those aromatic polyisocyanates such as TDI, MDI and/or their isomers and/or their dimerized and trimerized forms are preferably used.

Examples of the polycarboxylic acids C are terephthalic acid, isophthalic acid, naphthalene dicarboxylic acid, adipic acid, azelaic acid, sebacic acid, decane dicarboxylic acid, cyclohexane dicarboxylic acid, butane tetracarboxylic acid, trimellitic acid, trimesic acid, pyromellitic acid, benzophenone tri- and tetracarboxylic acid and/or their anhydrides or esters.

In place of the polycarboxylic acids, ester carboxylic acids, which can be manufactured by reacting polyalcohols with an excess of polycarboxylic acids by known methods, may also be used.

Examples of the polyalcohols E are ethylene glycol, diethylene glycol, triethylene glycol, neopentyl glycol, butane-1,4-diol, hexane-1,6-diol, 1,4-bis-hydroxymethyl cyclohexane, trimethylol ethane, trimethylol propane, tris-(hydroxyethyl)-isocyanurate (THEIC). Polyols having 2-6 carbon atoms are preferred.

In place of the polyalcohols, ester alcohols, which can be manufactured by reacting polycarboxylic acids or their lower alkyl esters with polyalcohols by known methods, may also be used.

Low-molecular polyols having 2 to 4 primary hydroxyl groups are preferred.

For solderable polyurethane wire enamels, structural blocks AB—CD—EF or AB—EF are preferably used. For wire enamels resistant to high temperatures and based on polyester, polyester imide or polyamide imide, structural units having blocks AB—CD are preferred.

To ensure that the binder preparation according to the invention is stable under storage, in general the free isocyanate groups of the block polymer are protected using readily split off blocking agents.

Examples of such blocking agents are phenols, cresols, xylenols, benzyl alcohol, methyl diglycol, acetylacetone and acetoacetic acid ester.

The uncoated electrical conductor, which may be of copper or aluminium, is first coated with wire enamels in a plurality of coating applications, depending on its use. Each layer is cured in the wire enamelling stove before the next application of the wire enamel.

Conventional wire enamels are for example polyurethane wire enamels, polyester imide wire enamels and polyamide imide wire enamels.

Thereafter, the binder preparation is applied to the last cured wire enamel layer and curing is carried out in the wire enamelling stove.

The concentration of the binder according to the invention in the solutions is preferably 0.5 to 5% by weight.

Another aspect of this invention includes mixing the binder according to the invention with a conventional wire enamel composition. This mixture of wire enamel and binder according to the invention is also preferably applied after the last coat of enamel and cured in the wire enamelling stove.

The concentration of the binder according to the invention in the mixture can be for example 0.5 to 10% by weight and preferably 0.5–5% by weight, based on the mixture.

The binder preparation according to the invention makes it possible to equip electrical conductors provided with any enamel with a coating which enables the processing of the treated wires to be improved in fast winding machines for the manufacture of magnetic windings.

The enamelled wires equipped with the binder preparation according to the invention, and the magnetic windings manufactured therefrom, make it possible to use them for any applications in the electrical engineering sector. In particular, they do not lead to the known problems in special motors and enclosed relays.

When used as a mixture in wire enamel compositions, they have better compatibility with these compositions, and do not result in phase separation, agglomeration or precipitation even when these mixtures are stored for relatively long periods.

In particular, this is achieved by the particular cross-linking reaction of the block polymer that forms the basis of the lubricant according to the invention.

EXAMPLES

The invention will be explained in more detail with reference to the following examples, taking into account the following explanations. Hoechst wax S: a waxy acid mixture with an acid value of 145 mg KOH/g. Diisocyanatodiphenylmethane: a mixture of 55% by weight of 2,4'-isomer and 45% by weight of 4,4'-isomer.

Toluylene diisocyanate: a mixture of 80% by weight of 2,4-isomer and 20% by weight of 2,6-isomer.

Cresol: a technical-grade mixture of phenol, cresols and xylenols.

Example 1

77.4 g of Hoechst wax S, 55 g of diisocyanatodiphenylmethane, 10 g of N-methyl pyrrolidone and 15 g of Solvesso 100® were heated over 1 hour to 150° C. in a 1-liter glass flask equipped with stirrer, thermometer and reflux condenser, and were stirred at this temperature for 2 hours. Then 30 g of methoxypropyl acetate, 30 g of Solvesso 100® and 26.8 g of trimethylol propane were added at 80° C. The temperature rose exothermically to 100° C. After the exothermic reaction had subsided, 20.8 g of neopentyl glycol and 150 g of diisocyanatodiphenylmethane were introduced at 80° C. The temperature rose exothermically to 120° C. After 1 hour, 515 g of cresol were added to block the free isocyanate groups and to act as the solvent. Then stirring was carried out for 1 hour. After cooling, the product solidified to give a pasty mass with a solids content of approximately 40%. Further dilution with cresol/Solvesso 100® in a ratio of 2/1 to approximately 4% solids content allowed the ready-to-apply lubricant to be obtained.

Example 2

200 g of N-methyl pyrrolidone, 77.4 g of Hoechst wax S, 42 g of trimesic acid and 155 g of diisocyanatodiphenylmethane were heated over 1 hour to 150° C. in a 1-liter glass flask equipped with stirrer, thermometer and reflux condenser, and were stirred at this temperature for 4 hours. During this time, 18.9 liters of carbon dioxide were given off. Then, 50 g of cresol were added at 100° C. to block the free isocyanate groups. This made the temperature rise exothermically to 120° C.

After 1 hour, dilution was carried out using 230 g of N-methyl pyrrolidone to approximately 40% solids content.

After cooling, the product solidified to give a pasty mass. Further dilution with N-methyl pyrrolidone/Solvesso 100® in a ratio of 2/1 to approximately 4% solids content allowed the ready-to-apply lubricant to be obtained.

Example 3
Manufacture of an Ester Carboxylic Acid 438 g (3 moles) of adipic acid and 134 g (1 mole) of trimethylol propane were reacted at 200–220° C. with the evolution of 54 g of water to give an ester carboxylic acid. The ester carboxylic acid had an acid value of 325 mg KOH/g; the molecular weight calculated was 518.
Manufacture of the Lubricant 200 g of N-methyl pyrrolidone, 77.4 g of Hoechst wax S, 51.8 g of the ester carboxylic acid, 14.6 g of adipic acid and 130 g of diisocyanatodiphenylmethane were heated over 1 hour to 150° C. in a 1-liter glass flask equipped with stirrer, thermometer and reflux condenser, and were stirred at this temperature for 4 hours. During this time, 19 liters of carbon dioxide were given off. Then 37 g of cresol were added at 100° C. to block the free isocyanate groups. This made the temperature rise exothermically to 120° C. After 1 hour, dilution was carried out using 110 g of N-methyl pyrrolidone and 100 g of xylene to approximately 40% solids content. After cooling, the product solidified to give a pasty mass. Further dilution with N-methyl pyrrolidone/Solvesso 100® in a ratio of 2/1 to approximately 4% solids content allowed the ready-to-apply lubricant to be obtained.

Example 4

200 g of N-methyl pyrrolidone, 77.4 g of Hoechst wax S, 58.4 g of adipic acid and 104.4 g of toluylene diisocyanate were heated over 1 hour to 150° C. in a 1-liter glass flask equipped with stirrer, thermometer and reflux condenser, and were stirred at this temperature for 4 hours.

During this time, 23 liters of carbon dioxide were given off. Then 26.8 g of trimethylol propane were added at 80° C. and, after the exothermic reaction had subsided, 110 g of diisocyanatodiphenylmethane were added. The temperature rose exothermically to 120° C. After 1 hour, 52 g of cresols were added. After a further hour, dilution was carried out using 370 g of N-methyl pyrrolidone to approximately 40% solids content. After cooling, the product solidified to give a pasty mass. Further dilution with N-methyl pyrrolidone/Solvesso 100® in a ratio of 2/1 to approximately 4% solids content allowed the ready-to-apply lubricant to be obtained.

Seven coats of a commercially available polyamide imide wire enamel were applied to a copper wire 1 mm in diameter, and curing was carried out after each coat at an oven temperature of 550° C.

The lubricants from Examples 1–4 were respectively applied as an $8^{th}$ coat and were also cured.

In a comparison experiment, the polyamide imide enamelled wire produced with 7 coats was coated with a commercially available paraffin lubricant after leaving the wire enamelling stove.

The enamelled wires were tested according to DIN EN 60851. The sliding capacity was determined by making five twists 125 mm long according to DIN EN 60172, cutting into them at the loop and drawing them apart at the opposing ends using a tensile testing machine. The maximum force needed for this is inversely proportional to the sliding capacity.

The results are shown in the following list:

| Example | 1 | 2 | 3 | 4 | comparison |
|---|---|---|---|---|---|
| Coating increase ($\mu$m) | 59 | 60 | 59 | 58 | 57 |
| Softening point measured (° C.) | >435 | >435 | >435 | >435 | >435 |
| tan δ gradient (° C.) | 283 | 283 | 279 | 279 | 280 |
| Sliding capacity (N) | 23 | 20 | 25 | 28 | 42 |

The above results show that the lubricants of Examples 1–4 provided significantly improved sliding capacity in comparison to thee commercially available paraffin lubricant.

What is claimed is:

1. A binder comprising a structural block polymer of structural blocks of A and B and at least one of the structural blocks of C and D or E and F and wherein the structural blocks are formed from:
   A aliphatic, saturated or unsaturated, linear or branched monocarboxylic acids having 15 to 50 carbon atoms,
   B aromatic and/or aliphatic polyisocyanates having at least 2 isocyanate groups,
   C aromatic and/or aliphatic polycarboxylic acids having at least 2 carboxyl and/or anhydride groups,
   D aromatic and/or aliphatic polyisocyanates having at least 2 isocyanate groups which may be the same as or different from B,
   E polyalcohols having at least 2 hydroxyl groups, and
   F aromatic and/or aliphatic polyisocyanates having at least 2 isocyanate
groups which may be the same as or different from B and D, and wherein the composition of the block polymer corresponds to the following definition:

$(f+g)/h$=0.5 to 1.0

$i/(h-f-g)$=2.0 to 25.0

$a/(c+e)$=0.1 to 1.0 where a=total moles of A, c=total moles of C, e=total moles of E, f=total equivalents of hydroxyl groups, g=total equivalents of carboxyl and anhydride groups, h=total equivalents of isocyanate groups, i=total moles of A to F.

2. A binder according to claim 1 in which the block polymer comprises structural blocks AB—CD—EF.

3. A binder according to claim 1 in which the block polymer comprises structural blocks AB—CD.

4. A binder according to claim 1 in which the block polymer comprises structural blocks AB—EF.

5. A binder according to claim 4 in which A is a waxy acid having 24–36 carbon atoms, B and F are aromatic diisocyanates and E is polyol having 2–6 carbon atoms.

6. A binder according to claim 3 in which A is a waxy acid having 24–36 carbon atoms, B and D are aromatic diisocyanates and C is an aromatic dicarboxylic acid or tricarboxylic acid anhydride.

7. A binder according to claim 3 in which A is a waxy acid having 24–36 carbon atoms, B and D are aromatic diisocyanates and C is a reaction product of an aliphatic dicarboxylic acid and a polyol having 2–6 carbon atoms.

8. A binder according to claim 3 in which A is a waxy acid having 24–36 carbon atoms, B and D are aromatic diisocyanates and C is aliphatic dicarboxylic acid.

9. A binder according to claim 1, wherein the ratios (f+g)/h are 0.6 to 0.9 and i/(h−f−g) are 2.5 to 10.

10. A binder according to claim 2, wherein a first reaction to give the structural block AB is carried out, structural block CD is formed at the same time as or after formation of the structural block AB, and in a subsequent reaction stage, the structural block EF is formed and incorporated into the polymer.

11. A binder according to claim 10 wherein the reactions are carried out at temperatures from 50 to 150° C.

12. A binder according to claim 1, wherein the block polymer selected from the group consisting of structural blocks AB—CD—EF and structural blocks AB—EF is blended with a solderable polyurethane wire enamel.

13. A binder according to claim 1, wherein the block polymer consisting of structural blocks AB—CD is blended with a high temperature wire enamel selected from the group consisting of polyester wire enamel, polyester imide wire enamel and polyamide imide wire enamel.

14. A coating composition used as a lubricant for the enamel on wires containing the binder of claim 1.

15. An enamel wire coated with a lubricant, based on the binder according to claim 1.

\* \* \* \* \*